(12) United States Patent
Schempp et al.

(10) Patent No.: US 7,145,424 B2
(45) Date of Patent: Dec. 5, 2006

(54) SOLENOID ASSEMBLY

(75) Inventors: Roland Schempp, Vaihingen (DE); Lars Olems, Stuttgart (DE)

(73) Assignee: Bosch Rexroth AG, Stuttgart (DE)

( * ) Notice: Subject to any disclaimer, the term of this patent is extended or adjusted under 35 U.S.C. 154(b) by 0 days.

(21) Appl. No.: 10/555,787

(22) PCT Filed: May 3, 2004

(86) PCT No.: PCT/DE2004/000928

§ 371 (c)(1), (2), (4) Date: Nov. 28, 2005

(87) PCT Pub. No.: WO2004/102050

PCT Pub. Date: Nov. 25, 2004

(65) Prior Publication Data

US 2006/0114089 A1    Jun. 1, 2006

(30) Foreign Application Priority Data

May 8, 2003    (DE) ................ 103 20 729

(51) Int. Cl.
*H01F 7/08*    (2006.01)
(52) U.S. Cl. .............. 335/267; 335/259; 335/268; 251/129.02; 251/129.1
(58) Field of Classification Search ........ 335/253–255, 335/259, 264, 266, 267; 251/129.02, 129.09, 251/129.1; 123/90.5
See application file for complete search history.

(56) References Cited

U.S. PATENT DOCUMENTS

| 3,235,777 | A |   | 2/1966  | Hatashita |
| 3,893,053 | A |   | 7/1975  | Onatsevich |
| 3,895,331 | A |   | 7/1975  | Saarem |
| 4,422,060 | A | * | 12/1983 | Matsumoto et al. ........ 335/256 |
| 4,494,096 | A |   | 1/1985  | Fuzzell |
| 4,697,164 | A |   | 9/1987  | Eilertsen |
| 5,309,944 | A |   | 5/1994  | Chikamatsu et al. |

FOREIGN PATENT DOCUMENTS

| DE | 42 08 367 A1 | 9/1993 |
| DE | 43 16 637 A1 | 11/1993 |
| DE | 197 05 598 A1 | 8/1998 |
| EP | 0 564 794 A1 | 10/1993 |

* cited by examiner

*Primary Examiner*—Ramon M. Barrera
(74) *Attorney, Agent, or Firm*—Oliff & Berridge PLC

(57) ABSTRACT

What is disclosed is a lifting magnet assembly for a servo valve or control valve comprising a proportional magnet which acts on a valve spool of the control valve or servo valve through a tappet. Between the spool and the proportional magnet a failsafe magnet is provided which is penetrated or encompassed by the tappet of the proportional magnet.

15 Claims, 2 Drawing Sheets

SOLENOID ASSEMBLY

Figure 1:
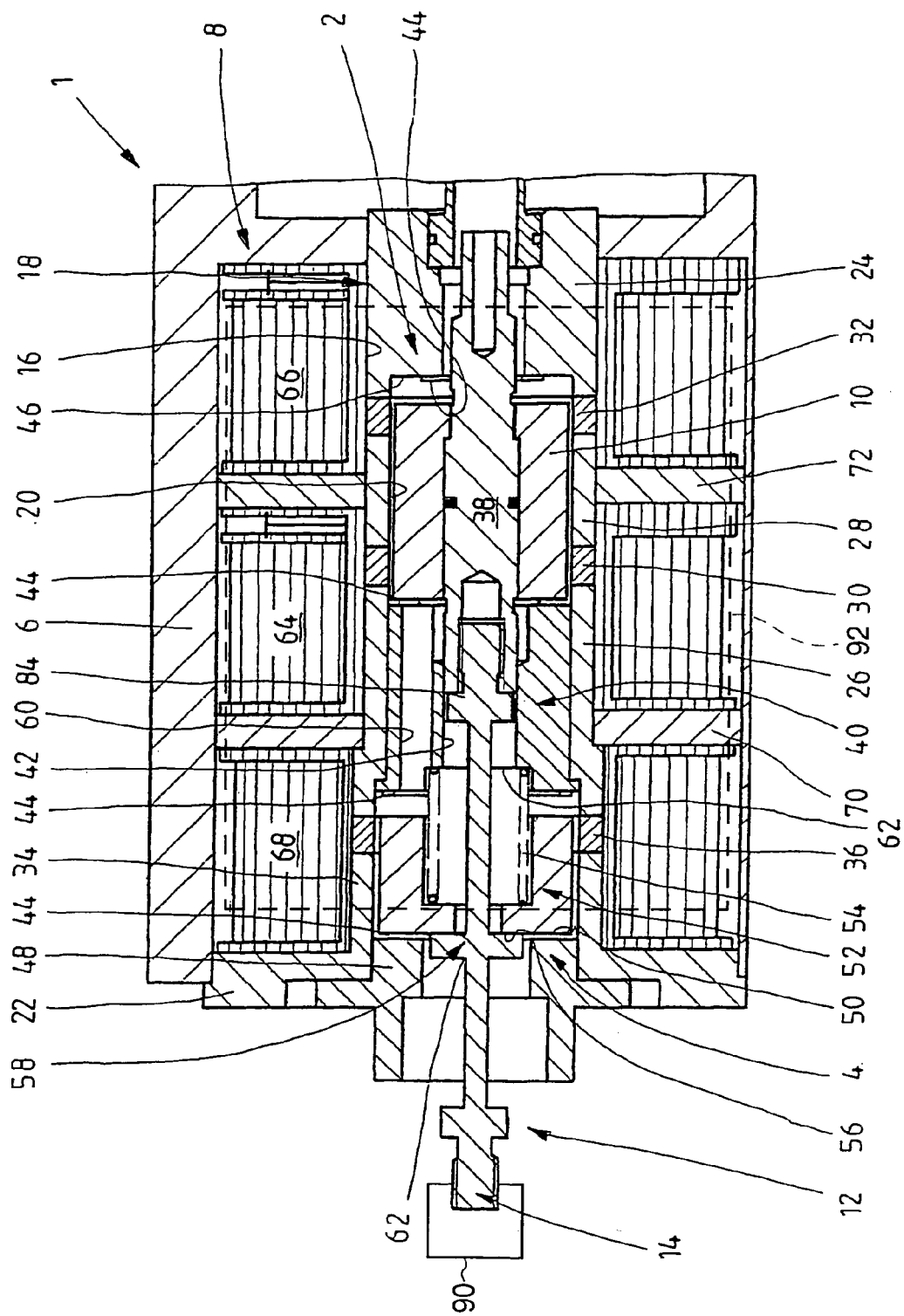

The invention concerns a lifting magnet assembly for a hydraulic valve, in particular for a servo valve or control valve in accordance with the preamble of claim 1.

In proportional valve and servo valve technology, proportional magnets are as a general rule used for actuating valve spools. For the case of a power failure, the valve spool must be shifted into a predetermined position in which the direction and magnitude of a pressure medium volume flow is controlled such that a safe operating condition of the controlled hydraulic system is established.

In the most simple case, this failsafe position is adjusted by means of a centering spring arrangement whereby the valve spool is biased into a basic position. It is a drawback of this solution that owing to the centering springs, the dynamics of the valve are degraded, for the spring force must initially be overcome by the proportional magnets so as to take the valve spool into a control position. In addition, the inherent frequency or limit frequency of the valve is modified by the centering springs. At increased dynamic demands to the proportional valve it is therefore not possible to use such centering springs. In this case it is then possible to arrange an additional failsafe valve between the proportional valve and the user in order to ensure a defined, i.e. safe, pressure and flow situation. This additional failsafe valve does, however, require considerable additional complexity that is caused by hydraulically and electrically incorporating the failsafe valve, and the correspondingly complex switching logics.

From DE 43 16 637 C2 a lifting magnet assembly is known wherein, in addition to a conventional proportional magnet, failsafe means including a failsafe coil and a failsafe armature are provided. The latter is biased by a spring into a position of contact against the armature of the proportional magnet which in turn acts on a valve spool. In the event of a power failure, i.e., when the proportional magnet is de-energized and the failsafe means are de-energized, the valve spool is shifted into a failsafe position by means of the spring-biased failsafe armature and the armature of the proportional valve. Upon energization of the failsafe means, the failsafe armature is moved away from the armature of the proportional magnet against the force of the spring, so that the valve spool is shifted into a control position depending on from DE 43 16 637 C2 does, however, not permit to detect the stroke of the proportional magnet by a conventional stroke measuring system which is axially arranged at the side of the proportional valve facing away from the valve spool, for the failsafe magnet is already provided in this range.

From DE 197 05 598 A1 a proportional valve or servo valve is known wherein the proportional magnet for actuating the valve spool is provided with a rotatable armature. The failsafe position in this known solution is adjusted in that in the de-energized condition the armature is rotated relative to stator poles secured to the housing, and this rotary movement of the armature is transmitted to the valve spool via an adapted control geometry, so that the latter is in turn shifted into a failsafe position. It is a drawback of this solution that considerable complexity in terms of device technology is required for mounting the armature and transmitting the rotary movements.

In contrast, the invention is based on the object of furnishing a lifting magnet assembly for a hydraulic valve which may in the event of a current failure be shifted into a failsafe position with minimum complexity in terms of device technology.

This object is achieved through a lifting magnet assembly having the features of claim 1.

The lifting magnet assembly in accordance with the invention comprises, in addition to a conventional proportional magnet including a coil arrangement and an armature, failsafe means hereinafter referred to as FS means that are formed—when viewed in the axial direction—between a valve spool of the valve and the proportional valve, i.e., the coil arrangement and the associated armature. The armature or a tappet coupled with the latter penetrates or encompasses the FS means. A like construction allows to provide a stroke measuring system in the customary manner on the side of the proportional magnet facing away from the valve spool, so that the lifting magnet assembly may be designed to be very compact and simple.

In a particularly preferred embodiment, the tappet of the armature of the proportional valve, which is coupled with the valve spool, includes a stop collar which is contacted by a FS armature of the FS means in order to adjust the FS position. This FS armature is biased in a direction towards the FS position by means of a spring.

In a variant of the invention, this spring is supported on a pole piece which in turn is inserted in a range between the armature of the proportional magnet and the FS armature in a pressure tube of the lifting magnet assembly.

In an alternative solution, the FS armature itself functions as a pole piece that is slidably guided in the pressure tube. Here it is preferred if the FS armature has a stepped design and an end portion having a smaller diameter is guided in the range of the pressure tube in which the armature of the proportional magnet is also mounted slidably. A portion of the FS armature having a larger diameter is received in a correspondingly enlarged range of the pressure tube, with the spring attacking on this larger-diameter range.

In order to reduce the axial structural length of the lifting magnet assembly it is possible to provide in this larger-diameter range of the FS armature an annular groove into which the spring plunges. The latter is then supported on a radial shoulder of the pressure tube.

The FS armature may also be given a cup shape, so that the spring attacks at an inner end face of the cup-shaped FS-piston.

Depending on the construction, the tappet of the proportional magnet is guided in the pole piece adjacent the armature and/or in the FS armature.

In order to minimize the fall delay, the end faces that are contacted by the FS armature or by the armature of the proportional magnet are provided with non-magnetizable material.

In a particularly preferred embodiment of the invention, the proportional magnet has the form of a double-action lifting magnet comprising two coils, whereby a respective stroke in opposite directions may be realized.

The FS coil and the two coils of the double-action lifting magnet are preferably arranged coaxial with each other.

Driving of the FS means may be effected either by means of a separate end stage or by conducting the summed current of the two coils of the double-action lifting magnet through the FS coil of the FS means. In principle, the FS means may also directly be connected to the power supply of the valve electronics such that, when the lifting magnet assembly is de-energized, the released magnetic energy of the FS means continues to supply the proportional magnet with current for some milliseconds, thus shortening the time span during which the valve spool is not controlled any more and the FS position has not been reached yet.

Further advantageous developments of the invention are subject matter of further subclaims.

Figure 2:
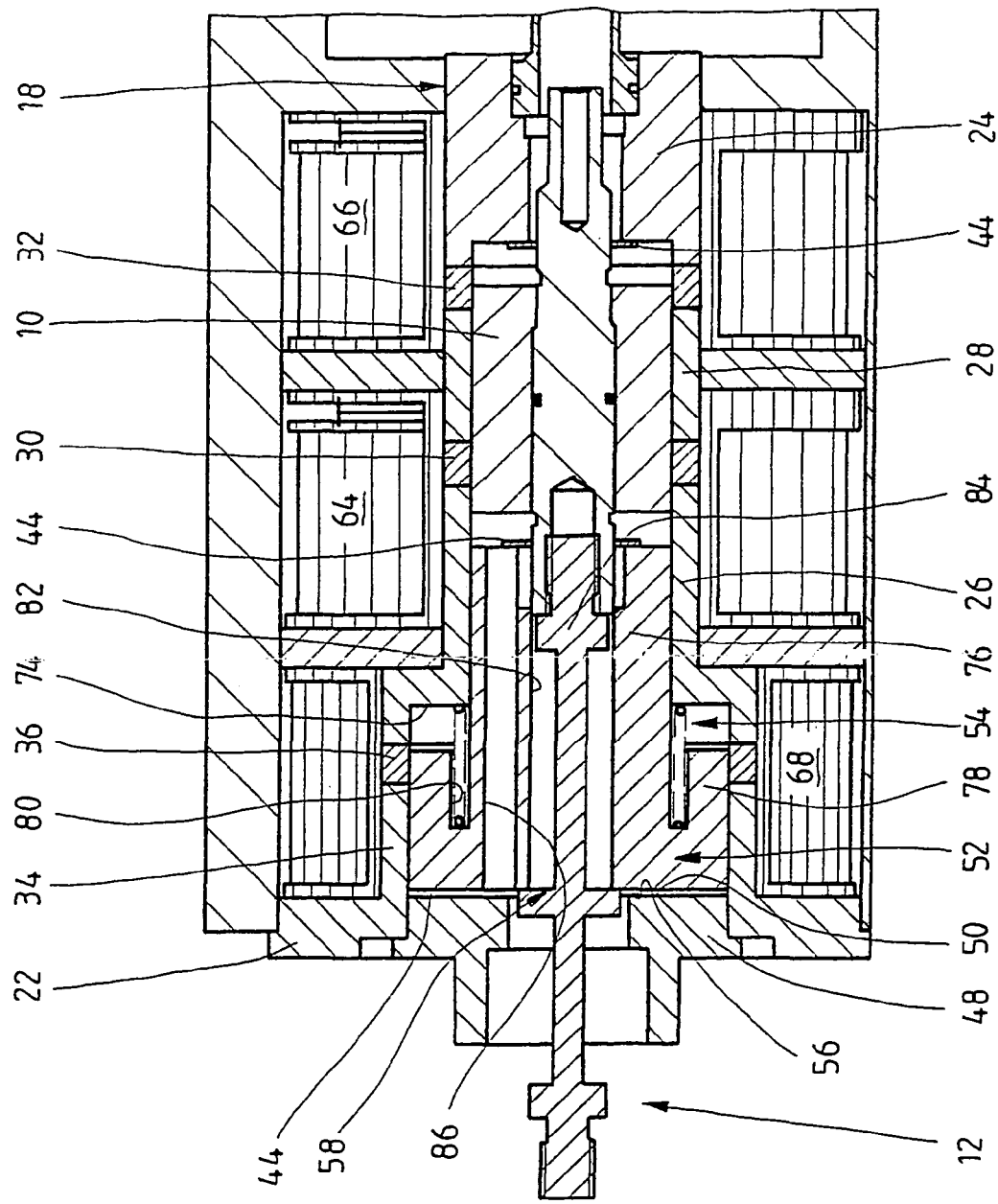

In the following, preferred embodiments of the invention shall be explained in more detail by referring to schematic drawings, wherein:

FIGS. 1 and 2 show two embodiments of a lifting magnet assembly for a servo valve or control valve, wherein a proportional magnet of the lifting magnet assembly has the form of a double-action lifting magnet.

FIG. 1 shows a longitudinal sectional view of a lifting magnet assembly 1 of a servo valve or control valve. The lifting magnet assembly 1 essentially consists of a double-action lifting magnet 2 and a failsafe (FS) magnet 4 that are arranged in a housing 6 of magnetically conductive material. The double-action lifting magnet 2 includes a coil arrangement 8 and an armature 10 that is coupled with a tappet 12, whereby a spool 90 of the control valve or servo valve may be actuated. This spool 90 is placed on the threaded end portion 14 of the tappet 12. In a range of the housing 6 continuing to the right in FIG. 1, an inductive stroke measuring system is arranged whereby the stroke of the tappet 12 and thus the stroke of the valve spool 90 may be detected. Such a stroke measuring system is described, e.g., in DE 42 08 367 A1.

The housing 6 includes an axial bore 16 into which a pressure tube 18 is inserted. The latter is penetrated by a reception bore 20 in which i. a. the armature 10 of the double-action lifting magnet 2 is guided in an axially slidable manner. The pressure tube 18 has at its left-hand end portion a radially projecting mounting flange 22 whereby the lifting magnet assembly may be attached to the housing of the control valve. The pressure tube 18 is designed in several parts and includes a pressure tube end piece 24 and an armature tube formed by two intermediate parts 26, 28 as well as two ring parts 30, 32 disposed between the intermediate parts 26, 28, or between the intermediate part 28 and the pressure tube end piece 24, respectively. The pressure tube 18 moreover includes a pressure tube part 34 continuing into the flange part 22 and separated from the intermediate part 26 by another ring part 36. The pressure tube part 34 and the pressure tube end piece 24 acting as a pole piece for the armature 10 are made of magnetizable material like the intermediate parts 26 and 28.

In the embodiment represented in FIG. 1, the armature 10 includes an axially projecting center piece 38 into which the tappet 12 and core carriers (not shown) of the measurement sensor are screwed.

In the range of the reception bore 20 of the pressure tube 18 in which the armature 10 is guided, a pole 40 is inserted and immobilized in the axial direction. This pole 40 has a through bore 42 through which the tappet 12 and the left-hand end portion of the center piece 38 extend. The tappet is guided in the through bore by a radially projecting guide collar 84. The right-hand annular end face of the pole 40 in FIG. 1 forms a stop surface for the armature 10. In this contact range of the armature 10, a disc 44 of non-magnetic material is provided whereby a fall delay is shortened. The path of the armature 10 to the right in FIG. 1 is limited by a radial shoulder 46 of the reception bore 20 on which a disc 44 for shortening the fall delay is also provided. Such a disc 44 is also provided on the left-hand annular end face of the pole 40 in FIG. 1.

The end face-side opening range of the reception bore 20 is closed at least in portions by a pole piece 48 through which the tappet 12 extends. On a right-hand annular end face of the pole piece 48 (representation of FIG. 1), in turn, a disc 44 is provided. This annular end face 50 of the pole piece 48 that is provided with the disc 44 forms a stop for a FS armature 52 of the FS magnet 4. This FS armature 52 is biased through a spring 54 against the annular end face 50. The spring 54 is supported on an annular shoulder of the through bore 42 of the pole 40. The left-hand end face 56 of the FS armature (representation of FIG. 1) contacts in the represented position a radially projecting stop collar 58 of the tappet 12, so that the latter is driven by the FS armature 52 to the left (FIG. 1) until the end face 56 contacts the annular end face 50 of the pole piece 48. In this position, the armature 10 contacts the pole 40 by its left-hand end face. In other words, the valve spool of the control valve that is coupled with the tappet 12 is in the represented position shifted to its left-hand end position by the force of the spring 54.

In order to reduce the axial structural length of the lifting magnet assembly 1, the FS armature has a cup shape in the represented embodiment, wherein the spring 54 plunges by portions thereof into the FS armature 52 and attacks at an internal end face 62.

The lifting magnet assembly represented in FIG. 1 is filled with pressure medium, with a longitudinal bore 60 being provided in the pole piece 40 so that pressure medium may enter from the space accommodating the FS armature 52 into the space accommodating the armature 10 and from there via a radially set-back connecting bore into a space of the housing 6 accommodating the stroke measuring system 92.

The coil arrangement 8 comprises two coils 64, 66 that are driven by two separate control circuits. The coils 64, 66 are connected such as to generate oppositely directed forces in the operating air gaps of the double-action lifting magnet, so that pulling and pushing forces may be generated. In the rest position represented in FIG. 1, both coils 64, 66 are subjected to a pilot current being about half of the maximum current of a coil. The forces then oppositely acting on the armature 10 hold the latter in its basic position wherein the armature 10 is positioned approximately in the center between the radial shoulder 46 of the reception bore 20 and the adjacent annular end face of the pole 40. By changing the energization in one or in both coils 64, 66, the equilibrium of forces on the armature 10 is disturbed, and the latter is then correspondingly shifted to the right or to the left by the resulting magnetic force. Owing to the pilot magnetization, the dynamics of the double-action lifting magnet are improved. By the symmetrical design of the force ratios the design of a positional control with the aid of the stroke measuring system (not represented) is simplified considerably.

The FS magnet 4 comprises a FS coil 68 through which the above described summed current of the two coils 64, 66 flows in the embodiment represented in FIG. 1. The FS armature is then acted on by a magnetic force high enough to raise it against the force of the spring 54 from the annular end face 50 of the pole piece 48 and thus also cancel contact at the stop collar 58. The tappet 12 and thus the armature 20 may then be displaced into one of the control positions through their basic position subject to the summed current, or by corresponding driving.

Between the coils 64, 66 or the coils 68, 64 those pole discs 70, 72 of magnet flux-conducting material are arranged which extend in the radial direction between the housing 6 and the pressure tube 18.

In the event of power failure or de-energization of the lifting magnet assembly, all three coils 64, 66, 68 are de-energized, so that no magnetic forces act on the armature 52, 10. Accordingly, the FS armature 52 may be shifted to the left by the force of the spring 54, where it contacts the annular end face 50 of the pole piece 48. During this stroke, the FS armature 52 contacts the stop collar 58, so that the tappet 12 and thus the valve spool are displaced into the mentioned end position.

Instead of the solution where the FS coil 68 is subjected to the summed current of the two coils 64, 66, the FS magnet 4 might also be supplied via a dedicated end stage. In this case an excessive excitation would, for instance, be possible upon its activation, whereby the structural size of the FS magnet is reduced. In a second alternative, the FS magnet 4 may also be connected directly to the power supply of the valve electronics. With a suitable circuitry design, energy of the FS magnet 68 released upon de-energization might then continue to supply the double-action lifting magnet 2 with current for several milliseconds. This would reduce the time during which the valve spool is not controlled any more, with the spring 54 not yet having shifted the valve spool—or more precisely the tappet 12—together with the armature 20 into the predefined end position. In principle this end position might also be a separately defined FS position that is only set upon de-energization.

FIG. 2 shows a variant where this setting of the FS position is facilitated by a greater stroke of the tappet 12.

The basic structure of the embodiment of a lifting magnet assembly 1 as represented in FIG. 2 essentially corresponds to the one of the above described embodiment, so that in the following only those components changed in comparison with the above described embodiment shall be discussed.

The pressure tube 18 includes, similar to the above described embodiment, a pressure tube end piece 24, intermediate parts 26, 28, as well as a pressure tube part 34 formed integrally with the flange part 22. Between the above mentioned components of the pressure tube 18, the non-magnetizable ring parts 30, 32 and 36 are in turn disposed.

It is an essential difference with the above described embodiment that the version of the FS armature 52 represented in FIG. 2 concurrently forms the pole 40. To this end, the FS armature 52 is formed as a stepped armature having a radially set-back end portion 76 and a radially projecting base part 78. The latter is guided in a space limited by the pressure tube part 34 and by the left-hand end portion (FIG. 2) of the intermediate part 26 having a radial shoulder 74. The base part 78 of the FS armature 52 includes an annular groove 80 into which the left-hand end portion (FIG. 2) of the spring 54 plunges, which in turn is supported on the radial shoulder 74. This annular groove 80, which accommodates a part of the spring 54, contributes to shortening the axial length of the lifting magnet assembly 1.

The FS armature 52 is biased by the spring 54 with its left-hand end face 56 against the annular end face 50 of the pole piece 48. In the range of contact, in turn, a disc 44 of non-magnetizable material is disposed. A corresponding disc 44 is disposed on the right-hand (FIG. 2), smaller end face of the FS armature 52. The latter includes an axially extending bore 82 through which the tappet 12 and the adjacent end portion of the center piece 38 of the armature 10 extend. In the range of this bore 82 the guide collar 84 is formed on the tappet 12, so that the tappet is guided within the FS armature 52 in this embodiment.

The FS armature 52 moreover includes a connecting bore 86 whereby the space axially adjacent the pole piece 48 is connected with the space of the pressure tube 18 accommodating the armature 10, so that complete filling of the lifting magnet assembly with pressure medium is ensured.

Owing to the pressure tube 18 radially expanded in the range of the pressure tube part 34, the FS coil 68 must be wound in a radially somewhat more compact configuration in comparison with the other two coils 64, 66. Driving the FS coil 68 is effected in the same manner as in the above described embodiment, preferably by means of the summed current of the two coils 64, 66 of the double-action lifting magnet, or by means of a dedicated end stage or the valve electronics.

If a power failure occurs or the coils 64, 66, 68 are not energized, the FS armature 52 is shifted to the left by the force of the spring 54 until the larger end face 56 enters into contact with the annular end face 50 of the pole piece 48. Here the tappet 12 is driven through the intermediary of the stop collar 58 and, in accordance with the valve spool, taken into an end position which may correspond to an operative position of the valve or to a separate FS position.

When the two coils 64, 66 are energized and the FS coil 68 is energized correspondingly, the FS armature 52 is shifted to the right against the force of the spring 54, so that the contact between the FS armature 52 and the tappet is cancelled—the armature 10 may be shifted to the left or right (pull or push) unrestrictedly depending on the driving of the coils 64, 66, with the FS armature displaced into its right-hand stop position then acting as a pole.

The above described valve assemblies may furthermore be designed with a manual emergency bolt for axially shifting the armature 10 from outside into a desired position where necessary.

What is disclosed is a lifting magnet assembly for a servo valve or control valve comprising a proportional magnet which acts on a valve spool of the control valve or servo valve through a tappet. Between the spool and the proportional magnet a failsafe magnet is provided which is penetrated or encompassed by the tappet of the proportional magnet.

LIST OF REFERENCE SYMBOLS 1 lifting magnet assembly
2 double-action lifting magnet
4 failsafe magnet
8 housing
10 coil arrangement
12 armature
14 tappet
16 end portion
18 axial bore
20 pressure tube
22 reception bore
24 flange part
26 pressure tube end piece
28 intermediate part
30 intermediate part
32 ring part
34 pressure tube part
36 ring part
38 center piece
40 pole
42 through bore
44 disc
46 radial shoulder
48 pole piece
50 annular end face
52 FS armature
54 spring
56 end face (FS armature)
58 stop collar
60 longitudinal bore 62 internal end face
64 coil
66 coil
68 FS coil
70 pole disc
72 pole disc
74 radial shoulder
76 end portion
78 base part
80 annular groove
82 bore
84 guide collar
86 connecting bore

The invention claimed is:

1. A lifting magnet assembly for a hydraulic valve, comprising a pressure tube in which an armature is slidably guided which may be displaced by energizing a coil arrangement in order to actuate a valve spool of the valve by a tappet of the armature, and comprising failsafe means including a failsafe armature by means of which the tappet may be shifted into a predetermined failsafe position and which may be moved out of the failsafe position by energizing a failsafe coil, characterized in that the failsafe means are formed axially tappetside in front of the coil arrangement and are penetrated or by the tappet.

2. The lifting magnet assembly in accordance with claim 1, wherein the tappet includes a stop collar against which the FS armature slidingly guided in the pressure tube and biased in a direction towards the failsafe position may be taken into contact.

3. The lifting magnet assembly in accordance with claim 2, wherein a spring biasing the FS armature is supported on a pole piece arranged in the pressure tube between the armature and the FS armature.

4. The lifting magnet assembly in accordance with claim 2, wherein a spring biasing the FS armature is supported on a radial shoulder of the pressure tube, and the FS armature acts as a pole piece for the armature.

5. The lifting magnet assembly in accordance with claim 2, wherein the FS armature is biased against a pole inserted in the pressure tube.

6. The lifting magnet assembly in accordance with claim 3, wherein the FS armature is given a cup shape, at the internal end face of which the spring attacks.

7. The lifting magnet assembly in accordance with claim 4, wherein the FS armature has a stepped configuration, and a radially set-back end portion plunges into the part of the pressure tube in which the armature is guided, and wherein a radially projecting base part of the FS armature is guided in a correspondingly expanded part of the pressure tube.

8. The lifting magnet assembly in accordance with claim 7, wherein in prolongation of the end portion an annular groove is formed in the base part of the FS armature, into which the spring plunges with portions thereof.

9. The lifting magnet assembly in accordance with claim 1, wherein a disc of non-magnetizable material is provided between the end faces of the armature and the end face portions of the components entering into contact with the armature.

10. The lifting magnet assembly in accordance with claim 1, wherein the coil arrangement comprises two coils for the formation of a double-action lifting magnet.

11. The lifting magnet assembly in accordance with claim 1, wherein the FS coil and the coil arrangement are arranged coaxial with each other.

12. The lifting magnet assembly in accordance with claim 10, wherein a summed current of the two coils is conducted through the FS coil.

13. The lifting magnet assembly in accordance with claim 1, wherein the FS coil is supplied via a dedicated end stage.

14. The lifting magnet assembly in accordance with claim 1, wherein the FS coil is connected to the power supply of the valve electronics such that the magnetic energy released upon de-energization continues to supply the coil arrangement with current for several milliseconds.

15. The lifting magnet assembly in accordance with claim 1, including a stroke measuring system for detecting the stroke of the valve spool.

* * * * *